United States Patent
Lee

(10) Patent No.: US 6,832,291 B2
(45) Date of Patent: Dec. 14, 2004

(54) MEMORY SYSTEM FOR IMPROVING DATA INPUT/OUTPUT PERFORMANCE AND METHOD OF CACHING DATA RECOVERY INFORMATION

(75) Inventor: Hae-Seung Lee, Ahnyang (KR)

(73) Assignee: Samsung Electronics Co., Ltd., Suwon (KR)

( * ) Notice: Subject to any disclaimer, the term of this patent is extended or adjusted under 35 U.S.C. 154(b) by 222 days.

(21) Appl. No.: 08/931,125

(22) Filed: Sep. 16, 1997

(65) Prior Publication Data

US 2002/0007438 A1 Jan. 17, 2002

(30) Foreign Application Priority Data

Sep. 16, 1996 (KR) ............................................. 96-40202

(51) Int. Cl.⁷ ......................... G06F 12/16; G06F 12/08
(52) U.S. Cl. .............................. 711/114; 711/113; 714/6
(58) Field of Search ............................... 711/112, 113, 711/114; 714/6, 7, 8

(56) References Cited

U.S. PATENT DOCUMENTS

| | | | |
|---|---|---|---|
| 5,257,367 A | 10/1993 | Goodlander et al. | 707/204 |
| 5,341,381 A | 8/1994 | Fuller | 371/10.1 |
| 5,367,669 A | 11/1994 | Holland et al. | 395/575 |
| 5,418,921 A | 5/1995 | Cortney et al. | 711/114 |
| 5,455,934 A * | 10/1995 | Holland et al. | 711/4 |
| 5,463,765 A | 10/1995 | Kakuta et al. | 714/6 |
| 5,485,598 A | 1/1996 | Kashima et al. | 714/6 |
| 5,522,032 A | 5/1996 | Franaszek et al. | 714/6 |
| 5,530,948 A | 6/1996 | Islam | 714/6 |
| 5,572,660 A * | 11/1996 | Jones | 714/6 |
| 5,579,474 A | 11/1996 | Kakuta et al. | 714/6 |
| 5,583,876 A * | 12/1996 | Kakuta | 711/114 |
| 5,636,359 A | 6/1997 | Beardsley et al. | 711/122 |
| 5,640,506 A | 6/1997 | Duffy | 714/6 |
| 5,734,814 A * | 3/1998 | Corbin et al. | 714/6 |
| 5,737,741 A * | 4/1998 | Hilditch et al. | 711/114 |
| 5,809,206 A * | 9/1998 | Seki | 386/125 |
| 5,835,940 A * | 11/1998 | Yorimitsu et al. | 711/112 |

FOREIGN PATENT DOCUMENTS

| | | |
|---|---|---|
| JP | 7-210334 | 7/1995 |
| JP | 7-200190 | 8/1995 |

* cited by examiner

*Primary Examiner*—Gary Portka
(74) *Attorney, Agent, or Firm*—Robert E. Bushnell, Esq.

(57) ABSTRACT

A redundant array of inexpensive disks (RAID) system includes a plurality of defect-adaptive memory devices for sequentially storing information needed for data recovery in a predetermined region of a recording medium in the form of block, and storing data in a region other than the predetermined region. A plurality of caches are connected to the adaptive memory devices to store information blocks needed for data recovery, the information blocks being read from a predetermined memory device. A controller is connected to each adaptive memory device and cache to control the writing and reading of data and information needed for data recovery in each memory device, calculate information needed for recovery of data read from each memory device, and store the information needed for recovery of data calculated in a predetermined cache.

9 Claims, 5 Drawing Sheets

MEMORY SYSTEM FOR IMPROVING DATA INPUT/OUTPUT PERFORMANCE AND METHOD OF CACHING DATA RECOVERY INFORMATION

CLAIM OF PRIORITY

This application makes reference to, and claims all benefits accruing under 35 U.S.C. §119 from an application for MEMORY SYSTEM FOR IMPROVING DATA INPUT/ OUTPUT PERFORMANCE AND METHOD OF CACHING DATA RECOVERY INFORMATION earlier filed in the Korean Industrial Property Office on the $16^{th}$ of Sep. 1996, and there duly assigned Serial No. 40202/1996.

BACKGROUND OF THE INVENTION

1. Field of the Invention

The present invention relates to a memory system such as a redundant array of inexpensive disks (RAID) and, more particularly, to a redundant arrays of inexpensive disks capable of providing high data input/output performance and a method of caching data recovery information using the redundant array of inexpensive disks.

2. Description of the Related Art

A high technology computer system depends considerably on its central processor unit (CPU) and input/output subsystem to increase overall system performance. While the information processing speed of the CPU has been dramatically improved in recent years because of VLSI technology, the performance of the input/output subsystem has not improved as desired. This increases the time required to access data in the memory system. Furthermore, since the cost of restoring data has increased when an error is generated in the input/output subsystem, an input/output subsystem having excellent performance and reliability is needed. As a solution to this, a disk array system known as a redundant array of inexpensive disks (RAID) constructed of a number of relatively small capacity disk drives has been proposed as a low cost alternative to a single large expensive disk for storing digital information.

RAID systems are now commercially available as cost effective mass storage providing reliable and continuous services to a host computer or network file server. The theory of RAID is to use relatively inexpensive disks, which may individually have a higher chance of failure than expensive disks, and compensating for this higher failure rate by adding redundancy by creating and storing parity blocks to facilitate recovery from a disk failure. Reports on the performance and reliability of disk arrays are presented in "A Case For Redundant Arrays Of Inexpensive Disks(RAID)" by D. Patterson, G. Gibson, and R. H. Kartz, at Report No. UCB/CDS87/89, December 1987, Computer Science Division (EECS), University of California, Berkeley, Calif. 94720. Exemplars of contemporary RAID systems are disclosed in U.S. Pat. No. 5,257,367 for Data Storage System With Asynchronous Host Operating System Communication Link issued to Goodlander et al., U.S. Pat. Nos. 5,367,669 and 5,455,934 for Fault Tolerant Hard Disk Array Controller issued to Holland et al., U.S. Pat. No. 5,418,921 for Method And Means For Fast Writing Data To LRU Cached Based DASD Arrays Under Drivers Fault Tolerant Modes issued to Cortney et al., U.S. Pat. No. 5,463,765 for Disk Array System, Data Writing Method Thereof, And Fault Recovering Method issued Kakuta et al., U.S. Pat. No. 5,485,598 for Redundant Disk Array (RAID) System Utilizing Separate Cache Memories For The Host System And The Check Data issued to Kashima et al., U.S. Pat. No. 5,522,032 for RAID Level 5 With Free Blocks Parity Cache issued to Franaszek et al., U.S. Pat. No. 5,530,948 for System And Method For Command Queuing On RAID Levels 4 And 5 Parity Drives issued to Islam, U.S. Pat. No. 5,579,474 for Disk Array System And Its Control Method issued to Kakuta et al., U.S. Pat. No. 5,640,506 for Integrity Protection For Parity Calculation For RAID Parity Cache issued to Duffy, and U.S. Pat. No. 5,636,359 for Performance Enhancement System And Method For A Hierarchical Data Cache Using A RAID Parity Scheme issued to Beardsley et al.

As generally discussed in the Patterson report and subsequent contemporary RAID systems, the large personal computer market has supported the developement of inexpensive disk drives having a better ratio of performance to cost than single large expensive disk systems. The number of input/outputs (I/Os) per second per read/write head in an inexpensive disk is within a factor of two of the large disks. Therefore, the parallel transfer from several inexpensive disks in a RAID system, in which a set of inexpensive disks function as a single logical disk drive, produces better performance than a single large expensive disk (SLED) at a reduced cost.

Unfortunately, when data is stored on more than one disk, the mean time to failure varies inversely with the number of disks in the array. In order to correct for this decreased mean time to failure of the system, error recognition and correction is characteristic of all RAID systems. Generally, each RAID system is organized in six structures commonly referred to as six levels each having a different means for error recognition and correction as described hereinbelow.

In a RAID structure of level 0, data is distributed and stored in all drives in the disk array, taking interests in performance rather than data reliability.

In a RAID structure of level 1, the mirroring, a conventional method of improving the disk performance, has a high cost since all contents of the disk must be stored in a reproduction disk without change. Accordingly, in a database system requiring a large-capacity disk space, only the fifty percent of the disk space can be used. However, the mirroring is the best way to enhance the data reliability because identical data is stored in the reproduction disk. In a RAID structure of level 2, this is used to minimize the cost required to enhance data reliability. The RAID structure of level 2 distributes and stores data in each disk array in bites, and has several test disks using a Hamming Code, besides the data disk, in order to recognize and correct errors.

In a RAID structure of level 3, data is input/output in parallel to/from the drive when input/output is requested once, and parity data is stored in a separate drive. Furthermore, disk spindles are synchronized so as to make all drives simultaneously input or output data. Accordingly, rapid data transmission can be carried out even if parallel input/output is not performed fast. If one drive has an error, the erroneous data can be restored by using the currently operated drive and parity drive even though the total data rate is decreased. The RAID structure of level 3 is used in an application which requires very fast data transmission rate, super computer and image manipulation processors. That is, the RAID of level 3 has a efficiency in a long data block transmission but has a lower efficiency in a short data block transmission which requires fast input/output request. Furthermore, since the data drive is used together with a single drive for redundancy, a device which is smaller than that used in the RAID of level 1 is used but its controller becomes more expensive and complicated.

In a RAID structure of level 4, the parity data is calculated and stored in a separate drive, and data is striped across. The data can be restored when it has error. Its reading performance is similar to that of a RAID of level 1 but its writing is much poorer than the single drive because the parity information must be provided to the single drive. Thus, the RAID structure of level 5 having improved writing performance is supplemented to the RAID of level 4.

In a RAID structure of level 5, data is striped across in each drive array, and parity data is distributed and stored in all drives in order to remove the bottleneck phenomenon when data is written. In this RAID structure, since the data written in all drives must be read in order to calculate the parity when the data is written, its speed is slower. However, it is possible to process the data input/output transmission and to restore data stored in a drive having an error. Accordingly, the RAID structure of level 5 is effective in the recording of long pieces of data, and is also effective in the recording of short pieces of data if an application program gives weight to the data reading or the array design is improved in order to increase the writing performance. Even if the size of the data block is decreased, performance and data availability can be obtained to some degree. Moreover, the RAID structure of level 5 is most effective in terms of cost in comparison with a non-array device.

Among all disk array structures, the RAID structure of level 5 provides a higher reliability with smaller additional cost, and at the same time, makes the parallel disk access possible, resulting in the improvement of data processing rate. Generally, when data writing instruction is received from the host computer for writing in each drive in the RAID structure of level 5, the CPU determines a target location, and transmits the data to a controller where old data and old parity stored in each drive are read. The controller calculates a new parity based on an exclusive OR arithmetic operation, and writes new data and new parity in a predetermined drive. However, when a writing instruction of a short data block is received from the host computer in the RAID structure of 5 level, access of another disk on the strip is brought about which leads to a deterioration of the entire system performance. I have observed that this phenomenon appears in the on-line transaction processing environment having many operation loads. That is, in case of the partial strip writing, old parity and old data are read from a predetermined drive, a exclusive-OR operation is performed to determine new data, and then new parity information and new data are written in the predetermined drive. Two-time reading and writing operations are necessarily required which results in a larger overhead of data write in comparison with a single large expensive drive.

SUMMARY OF THE INVENTION

Accordingly, it is therefore an object of the present invention to provide a redundant array of inexpensive disks (RAID) system with an enhanced process performance and a reduced overhead of data write.

It is also an object to provide a RAID system capable of reducing an overhead during a read operation of data recovery information in order to improve its data input/output performance, and a method of caching data recovery information using the memory system.

These and other objects of the present invention can be achieved by a redundant array of inexpensive disks (RAID) system which includes a plurality of defect-adaptive memory devices for sequentially storing information needed for data recovery in a predetermined region of a recording medium in the form of block, and storing data in a region other than the predetermined region. A plurality of caches are connected to the adaptive memory devices to store information blocks needed for data recovery, the information blocks being read from a predetermined memory device. A controller is connected to each adaptive memory device and cache to control the writing and reading of data and information needed for data recovery in each memory device, calculate information needed for recovery of data read from each memory device, and store the information needed for recovery of data calculated in a predetermined cache.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
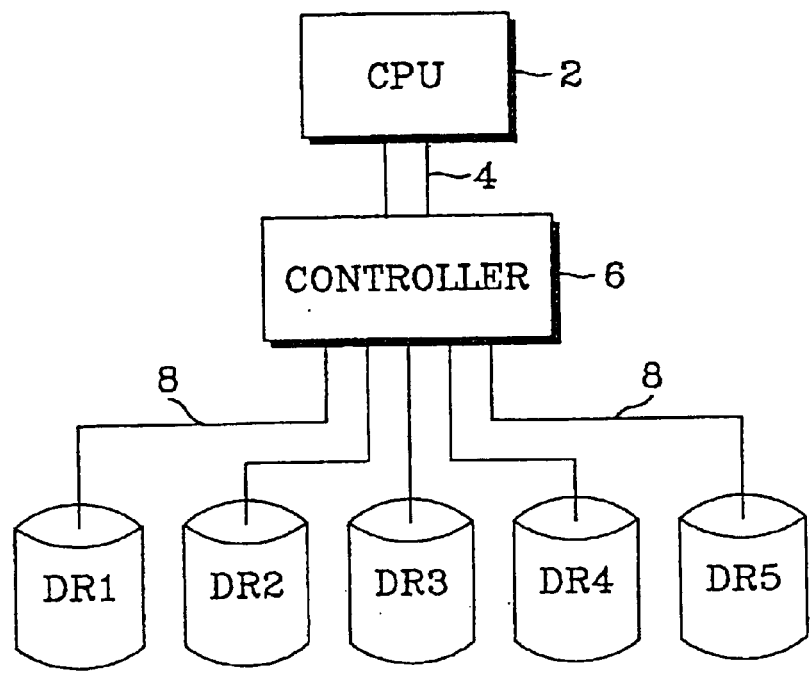
FIG. 1 is a block diagram of a RAID system.

Referring now to the drawings and particularly to FIG. 1, which illustrates a redundant array of inexpensive disks (RAID) system in level 5. As shown in FIG. 1, the RAID system includes a central processing unit (CPU) 2, a controller 6 connected to the CPU 2 via an input/output bus 4, and a plurality of disk drives DR1–DR5 connected to the controller 6 via SCSI bus 8.

CPU 2 transmits data transmitted through an input/output bus 4 from a host computer (not shown) to the controller 6. The controller 6 connected to input/output bus 4 is controlled by CPU 2 to control input/output data between drive disks DR1 to DR5 which are connected to CPU 2 and SCSI bus 8. Each drive DR1 to DR5 connected to SCSI bus 8 records and reproduces the data transmitted from the host computer under the control of controller 6.

Figure 2:
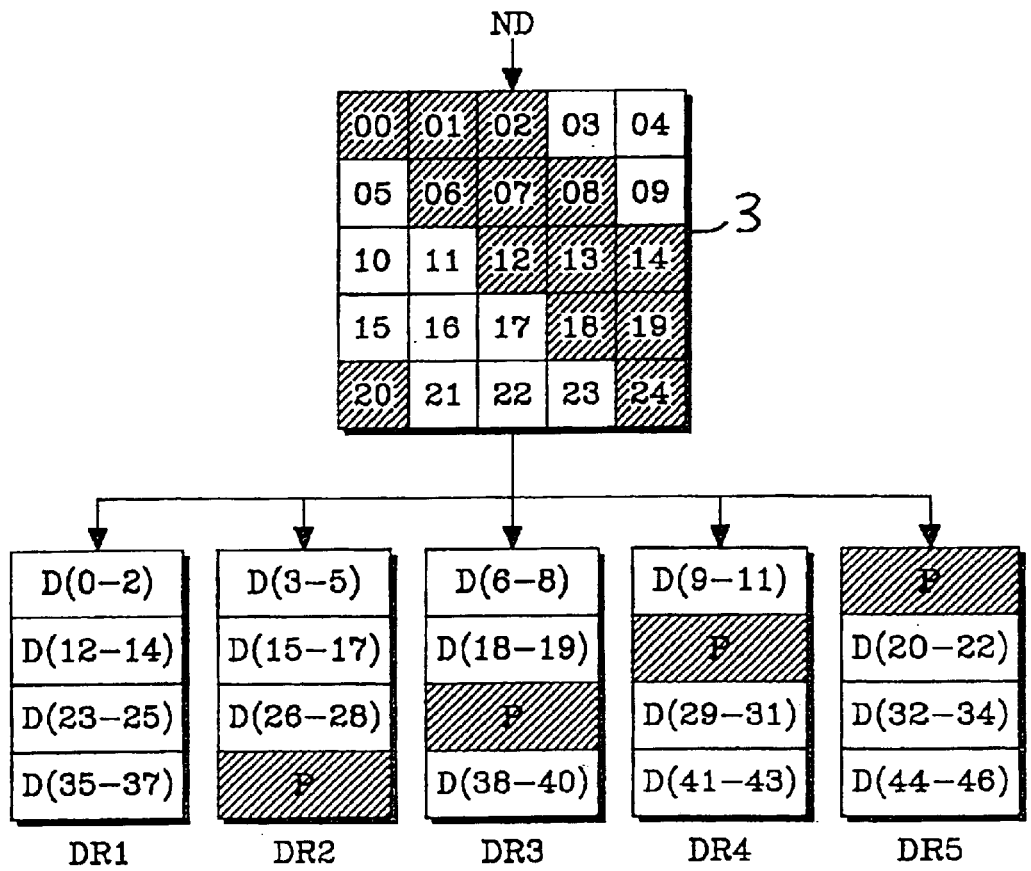
FIG. 2 illustrates an example of data transmission of the RAID system.

FIG. 2 illustrates an example of data transmission of the RAID structure in level 5. Data ND transmitted from the host computer is divided by strip (the data is divided by strip 3 in FIG. 2), distributed and stored in each drive DR1 to DR5. That is, each drive DR1 to DR5 has a data block D in which data is stored, and a parity block P in which parity information is stored, to thereby store the data transmitted from the host computer under the control of controller 6.

Figure 3:
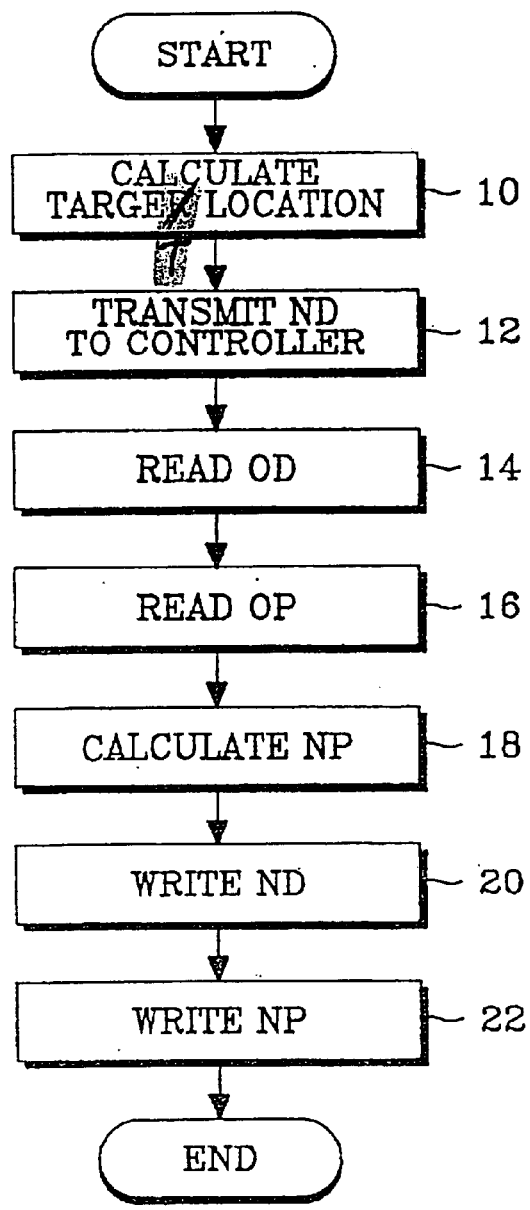
FIG. 3 is a flowchart illustrating a process of writing data and parity information transmitted from a host computer to each drive in the RAID system.

FIG. 3 is a flow chart for explaining the writing of the data and parity information transmitted from the host computer in each drive in the RAID structure of level 5. Referring to FIG. 3, when a data writing instruction is received from the host computer, the CPU 2 calculates a target location at step 10. At step 12, CPU 2 transmits the data transmitted from the host computer to controller 6. Controller 6 reads old data OD and old parity OP stored in each drive at steps 14 and 16. Next, the controller 6 calculates a new parity NP according to the following formula (1).

$$NP = OP \veebar OD \veebar ND \quad (\veebar \text{ means exclusive OR}) \qquad (1)$$

Controller 6 writes data ND and new parity NP in a predetermined drive at steps 20 and 22. As described, when a writing instruction of a short data block is received from the host computer in the RAID system of level 5 structure, access of another disk on the strip is brought about which leads to a deterioration to the entire system performance. This remarkably appears in the on-line transaction processing environment having many operation loads. That is, in case of the partial strip writing, old parity OP and old data OD are read from a predetermined drive, exclusive-ORed according to formula (1), its result is exclusive-ORed with data ND, and then new parity NP and new data ND are written in a predetermined drive. Thus, two-time reading and writing operations are needed which results in a larger overhead of write data in comparison with a single large expensive drive.

Figure 4:
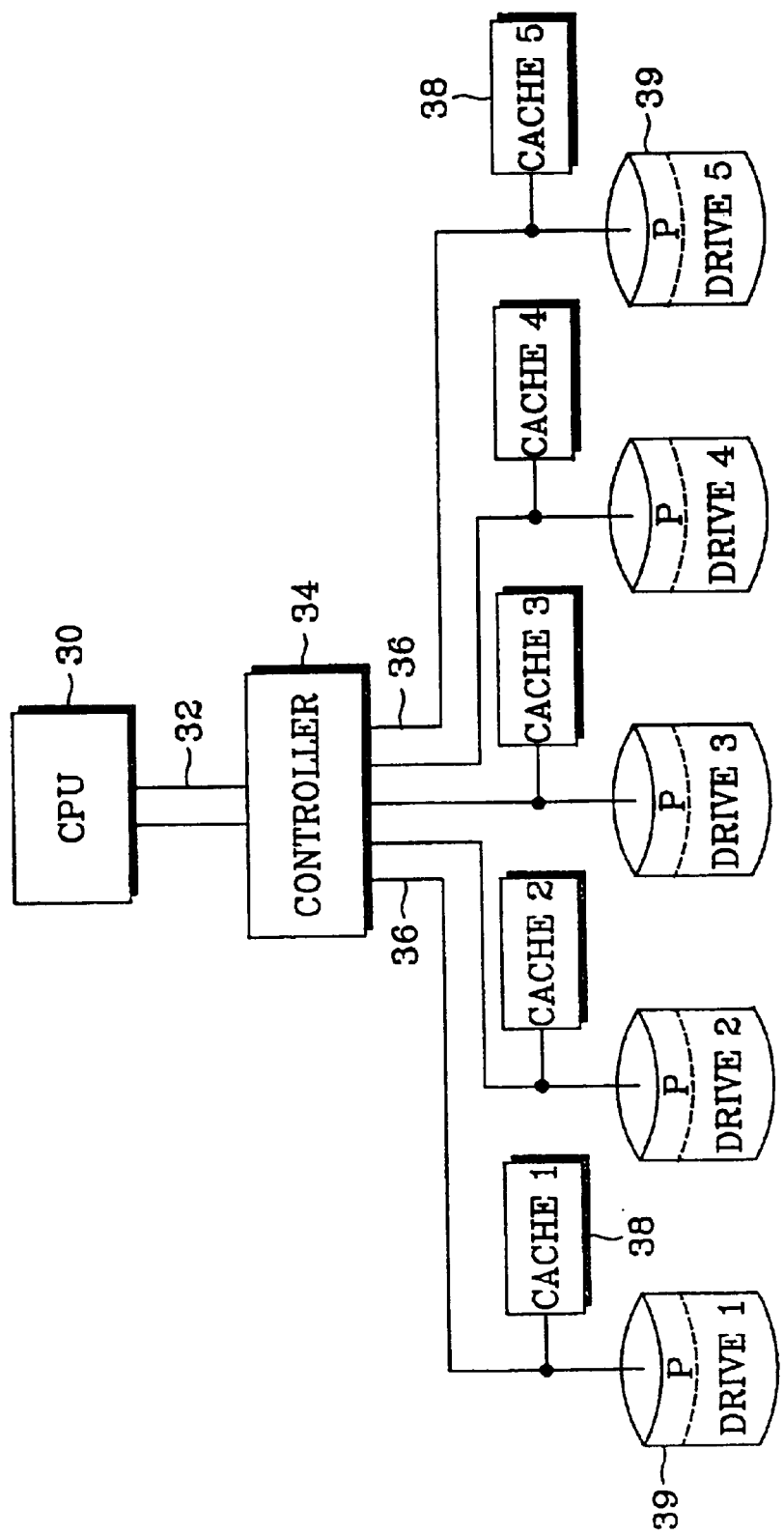
FIG. 4 is a block diagram of an RAID system constructed according to an embodiment of the present invention.

Turning now to FIG. 4 which illustrates a RAID system to which parity cache arrays 38 are connected according to an embodiment of the present invention. Referring to FIG. 4, the RAID system consists of a CPU 30 for controlling the overall system. A controller 34 is connected to CPU 30 through an input/output bus 32 to distribute and store data transmitted from a host computer to each drive array 39, or reproduce the stored data under the control of CPU 30. Drives 1 to 5 (39) are connected to controller 34 through SCSI bus 36 to store and reproduce the data and data recovery information (parity information) transmitted from the host computer under the control of controller 34. Caches 1 to 5 (38) are connected to controller 34 and input/output bus 36 placed between drives 39 to store the parity information.

Each drive 39 consists of a plurality of blocks in order to store and read the data and parity Furthermore, each drive 39 sets up the predetermined number of parity block from the cylinder zero on the disk, and uses it as a parity information storing region, without using the stripping method defined in the RAID structure in level 5. Here, the data cannot be recorded in the parity information storing region.

Figure 5:
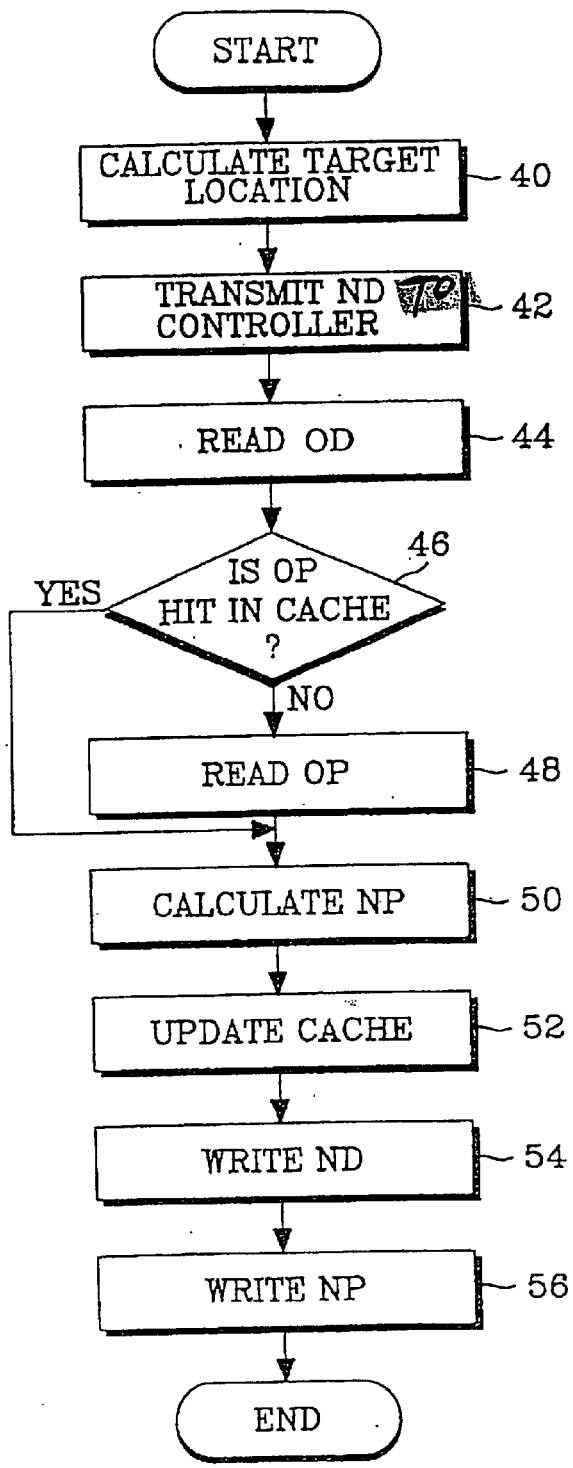
FIG. 5 is a flowchart illustrating a process of writing data and parity information in the RAID system constructed according to the embodiment of the present invention.
Figure 1:
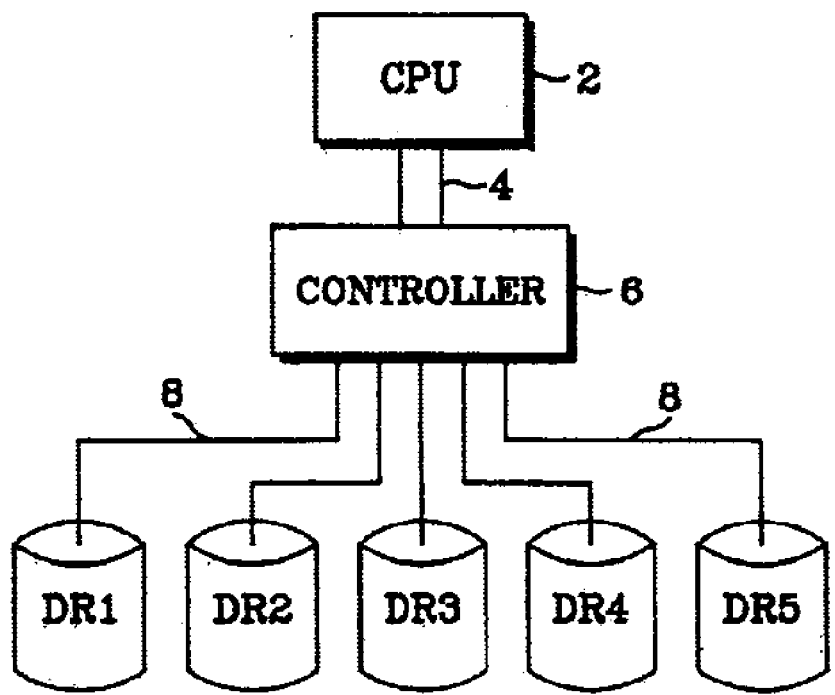
Figure 2:
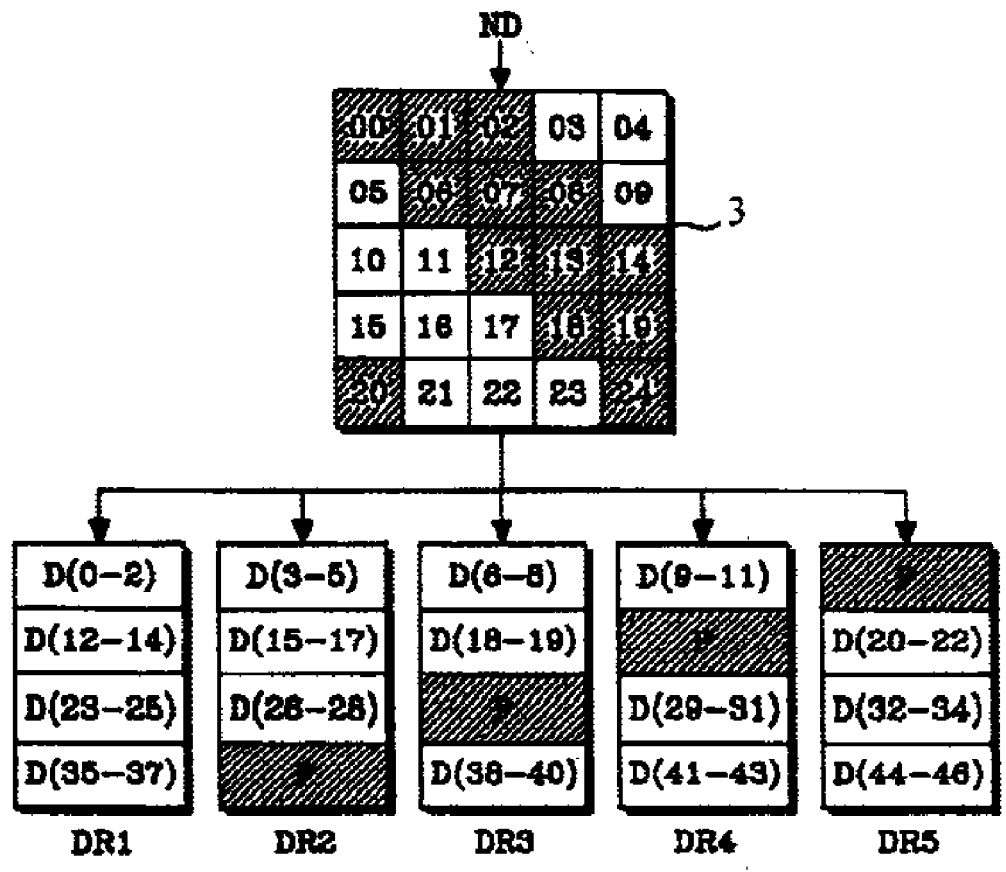
Figure 3:
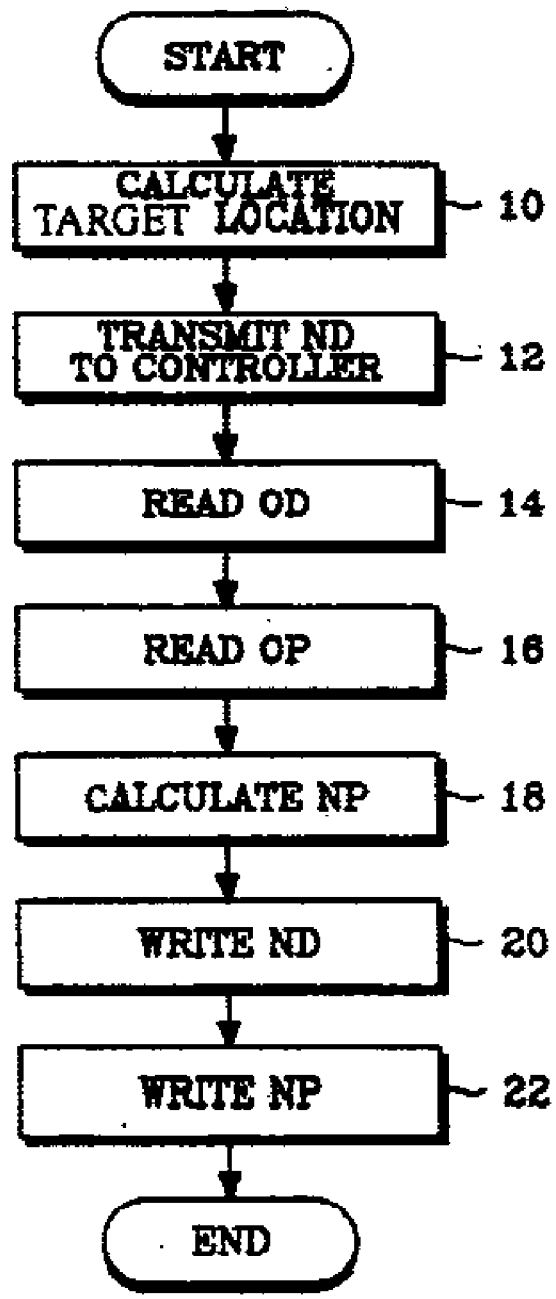
Figure 5:
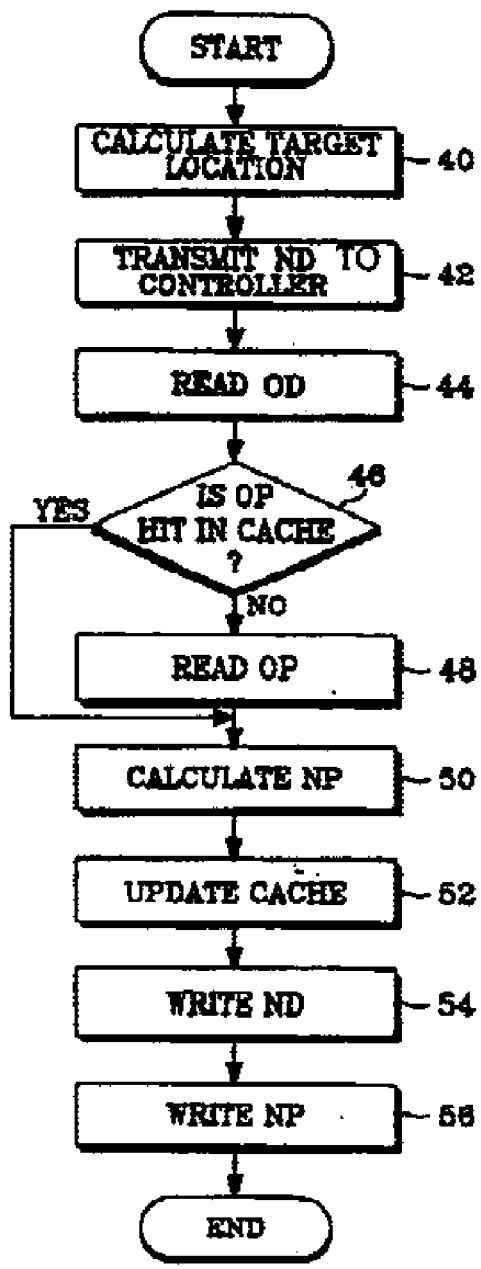

FIG. 5 a flow chart for explaining a process of writing data and parity information in the RAID system constructed according to the embodiment of the present invention. The control process of writing data will be explained in detail with reference to FIGS. 4 and 5 hereinbelow.

First of all, the data writing instruction is received from the host computer, the CPU 30 updates a task file in step 40, and then calculates a target cylinder (=parity block+request cylinder) in order to use a separate parity block in the drive. Then, the CPU 30 transmits new data ND to be written instep 42. The controller 34 next reads old data OD from a predetermined drive 39 in step 44 in order to generate new parity NP, and then examines if old parity information OP to be read is hit or accessed in cache 38 at step 46. Here, if the old parity information OP is hit in cache 38, controller 34 proceeds to step 50. If the old parity information is not hit or accessed in cache 38, the controller 34 proceeds to step 48. That is, when the old parity information are not hit or accessed in cache 38, the controller 34 reads the old parity information OP from the predetermined drive 39 in step 48, updates or loads a cache table, and then moves to step 50.

The controller 34 calculates a new parity NP by exclusive-ORing the old parity information read and the new data ND through the following formula (2).

$$NP = OP \veebar OD \veebar ND \qquad (2)$$

The controller 34 updates or loads the cache table and predetermined cache 38 in step 52, and then writes the new data ND transmitted from the host computer and the calculated new parity NP in a predetermined drive 39 in steps 54 and 56. Then, the data writing process of the present invention is completed.

According to the present invention, the parity cache is connected between each drive and controller in order to rapidly apply a parity information read request. Furthermore, sense the parity block for storing the parity information is set up from the cylinder zero on the disk, it is now possible to prevent a time delay due to a separate search when a sequential read/write operation is carried out.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

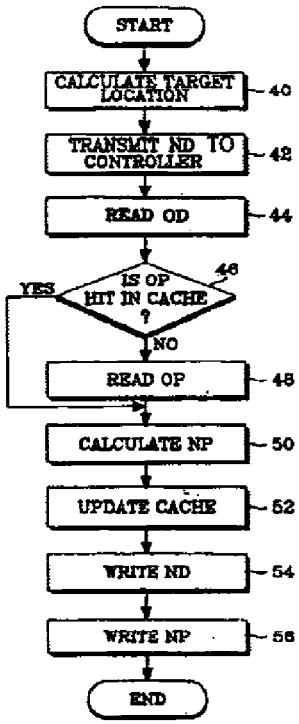

What is claimed is:

1. A redundant array of inexpensive disks level 5 memory system, comprising:

a plurality of defect-adaptive memory devices, each of said plurality of defect-adaptive memory devices having a first region for sequentially storing parity information for data recovery and a second region for storing data, with the parity information needed for data recovery being stored and sequentially arranged from a most outer cylinder on a recording medium in each corresponding one of said plurality of defect-adaptive memory devices;

a plurality of caches, each of said plurality of caches being respectively coupled operatively to a corresponding single unique one of said plurality of defect-adaptive memory devices, each of said plurality of caches being adapted for storing parity information for data recovery for a corresponding single unique one of said plurality of defect-adaptive memory devices to provide one-to-one caching; and a controller operatively coupled to each defect-adaptive memory device of said plurality of defect-adaptive memory devices and to each corresponding single unique cache of said plurality of caches, said controller selectively controlling writing and reading of parity information needed for data recovery in said first region of each corresponding single unique one of said plurality of defect-adaptive memory devices, selectively obtaining parity information needed for data recovery from said first region of each corresponding single unique one of said plurality of defect-adaptive memory devices, and selectively storing parity information needed for data recovery obtained from said first region of a corresponding single unique one of said plurality of defect-adaptive memory devices in a predetermined corresponding single unique one of said plurality of caches.

2. The memory system of claim 1, wherein parity information for data recovery is modified to a value obtained through a calculation of new data recovery information.

3. The memory system of claim 2, wherein parity information for data recovery is obtained by performing an exclusive-OR operation on previous data, parity information corresponding to the previous data, and new data.

4. A redundant array of inexpensive disks (RAID) level 5 system, comprising:

a plurality of disk drives, each of said plurality of disk drives including a first region having a plurality of data blocks for storing data and a second region having a predetermined number of parity blocks for storing parity information for data recovery, with the parity information needed for data recovery being stored and sequentially arranged from a most outer cylinder on a recording medium in each corresponding one of said plurality of defect-adaptive memory devices;

a plurality of caches, each of said plurality of caches being respectively coupled operatively to a corresponding single unique one of said plurality of disk drives, each of said caches being adapted for storing parity information for data recovery; and a controller adapted to provide one-to-one caching, said controller being operatively coupled to each disk drive of said plurality of disk drives and to each corresponding single unique cache of said plurality of caches, said controller being adapted for selectively controlling a write operation of data and parity information for a data recovery in each corresponding disk drive of said plurality of disk drives, said controller comprising:

first means for selecting a single predetermined disk drive of said plurality of disk drives upon receipt of a data writing instruction from a host computer;

second means for reading old data from the single predetermined disk drive of said plurality of disk drives;

third means for determining whether old parity information corresponding to the old data corresponding to the single predetermined disk drive of said plurality of disk drives is accessed in a corresponding single unique cache of said plurality of caches;

fourth means for reading the old parity information from the single predetermined disk drive of said plurality of disk drives, upon the old parity information corresponding to the single predetermined disk drive of said plurality of disk drives not being accessed in the corresponding single unique cache of said plurality of caches, and for then loading the corresponding single unique cache of said plurality of caches with the old parity information;

fifth means for obtaining new parity information by performing an exclusive OR operation on the old data, the old parity information and new data;

sixth means for loading the corresponding single unique cache of said plurality of caches with the new parity information; and seventh means for writing the new data in said region for storing data in the single predetermined disk drive of said plurality of disk drives, and for writing the new parity information in said another region for storing parity information in the predetermined single disk drive of said plurality of disk drives, whereby the data writing process is completed.

5. In a method of writing data to, and reading data from, a redundant array of inexpensive disks (RAID) level 5 system, said method comprising steps for sequentially storing information for data recovery in a first region of a disk, storing information comprising data in a second region of the disk other than the first region, controlling writing and reading of information by means of an electronic controller unit, and caching information for data recovery;

the improvement comprising a step for reducing overhead during a read operation for data recovery and thereby improving data input-output performance, wherein the parity information needed for data recovery is stored and sequentially arranged from a most outer cylinder on a recording medium in each corresponding one of said plurality of defect-adaptive memory devices.

6. The method of claim 5, wherein said step for reducing overhead during a read operation for data recovery and thereby improving data input-output performance comprises steps for:

(a) coupling each one of a plurality of caches to each corresponding one of a plurality of disks, whereby each disk is coupled one-to-one to one cache;

(b) operatively coupling the caches to the controller;

(c) storing, in each one of the plurality of caches, information for data recovery in the disk corresponding to the cache; and (d) determining information for data recovery in a disk by using information for data recovery stored in the cache corresponding to the disk.

7. A redundant memory system, comprising:

a plurality of defect-adaptive memory devices disposed in a redundant array of inexpensive disks accommodating storage of data and parity information representative of the data per sector across all of said memory devices within said array, with each of said plurality of memory devices having a first region disposed to sequentially store the parity information in sequential arrangement from a most outer cylinder in said first region, and a second region for storing the data;

a plurality of caches, each of said plurality of caches being respectively coupled operatively to a corresponding single unique one of said memory devices to store the parity information for the corresponding single unique one of said memory devices; and a controller operatively coupled to each defect-adaptive memory device of said plurality of defect-adaptive memory devices and to each corresponding single unique cache of said plurality of caches, for selectively controlling writing and reading of parity information needed for data recovery in said first region of each corresponding single unique one of said plurality of defect-adaptive memory devices;

wherein said first region comprises the most outer cylinder of a recording medium in each corresponding one of said memory devices.

8. The memory system of claim 7, wherein:

said controller selectively obtains parity information needed for data recovery from said first region of each corresponding single unique one of said plurality of defect-adaptive memory devices; and said controller selectively stores parity information needed for data recovery obtained from said first region of a corresponding single unique one of said plurality of defect-adaptive memory devices in a predetermined corresponding single unique one of said plurality of caches.

9. A redundant memory system, comprising:

a plurality of defect-adaptive memory devices disposed in a redundant array of inexpensive disks accommodating storage of data and parity information representative of the data per sector across all of said memory devices within said array, with each of said plurality of memory devices having a first region disposed to sequentially store the parity information in sequential arrangement from a most outer cylinder in said first region, and a second region for storing the data;

a plurality of caches, each of said plurality of caches being respectively coupled operatively to a corresponding single unique one of said memory devices to store the parity information for the corresponding single unique one of said memory devices; and a controller operatively coupled to each defect-adaptive memory device of said plurality of defect-adaptive memory devices and to each corresponding single unique cache of said plurality of caches, for selectively controlling writing and reading of parity information needed for data recovery in said first region of each corresponding single unique one of said plurality of defect-adaptive memory devices;

wherein said controller selectively obtains parity information needed for data recovery from said first region of each corresponding single unique one of said plurality of defect-adaptive memory devices; and wherein said controller selectively stores parity information needed for data recovery obtained from said first region of a corresponding single unique one of said plurality of defect-adaptive memory devices in a predetermined corresponding single unique one of said plurality of caches.

* * * * *

# UNITED STATES PATENT AND TRADEMARK OFFICE
CERTIFICATE OF CORRECTION

PATENT NO. : 6,832,291 B2
DATED : December 14, 2004
INVENTOR(S) : Hae-Seung Lee

It is certified that error appears in the above-identified patent and that said Letters Patent is hereby corrected as shown below:

Replace the current title page with the attached title page

<u>Drawings,</u>
Replace Figures 1, 2, 3 and 5 with the attached drawings

Signed and Sealed this

First Day of March, 2005

JON W. DUDAS
*Director of the United States Patent and Trademark Office*

(12) United States Patent
Lee

(10) Patent No.: US 6,832,291 B2
(45) Date of Patent: Dec. 14, 2004

(54) MEMORY SYSTEM FOR IMPROVING DATA INPUT/OUTPUT PERFORMANCE AND METHOD OF CACHING DATA RECOVERY INFORMATION

(75) Inventor: Hae-Seung Lee, Ahnyang (KR)

(73) Assignee: Samsung Electronics Co., Ltd., Suwon (KR)

(*) Notice: Subject to any disclaimer, the term of this patent is extended or adjusted under 35 U.S.C. 154(b) by 222 days.

(21) Appl. No.: 08/931,125

(22) Filed: Sep. 16, 1997

(65) Prior Publication Data
US 2002/0007438 A1 Jan. 17, 2002

(30) Foreign Application Priority Data
Sep. 16, 1996 (KR) ............................. 96-40202

(51) Int. Cl.$^7$ ..................... G06F 12/16; G06F 12/08
(52) U.S. Cl. ..................... 711/114; 711/113; 714/6
(58) Field of Search ..................... 711/112, 113, 711/114; 714/6, 7, 8

(56) References Cited

U.S. PATENT DOCUMENTS

| 5,257,367 A | 10/1993 | Goodlander et al. | 707/204 |
| 5,341,381 A | 8/1994 | Fuller | 371/10.1 |
| 5,367,669 A | 11/1994 | Holland et al. | 395/575 |
| 5,418,921 A | 5/1995 | Cortney et al. | 711/114 |
| 5,455,934 A * | 10/1995 | Holland et al. | 711/4 |
| 5,463,765 A | 10/1995 | Kakuta et al. | 714/6 |
| 5,485,598 A | 1/1996 | Kashima et al. | 714/6 |
| 5,522,032 A | 5/1996 | Franaszek et al. | 714/6 |
| 5,530,948 A | 6/1996 | Islam | 714/6 |
| 5,572,660 A * | 11/1996 | Jones | 714/6 |
| 5,579,474 A | 11/1996 | Kakuta et al. | 714/6 |
| 5,583,876 A * | 12/1996 | Kakuta | 711/114 |
| 5,636,359 A | 6/1997 | Beardsley et al. | 711/122 |
| 5,640,506 A | 6/1997 | Duffy | 714/6 |
| 5,734,814 A * | 3/1998 | Corbin et al. | 714/6 |
| 5,737,741 A * | 4/1998 | Hilditch et al. | 711/114 |
| 5,809,206 A * | 9/1998 | Seki | 386/125 |
| 5,835,940 A * | 11/1998 | Yorimitsu et al. | 711/112 |

FOREIGN PATENT DOCUMENTS

| JP | 7-210334 | 7/1995 |
| JP | 7-200190 | 8/1995 |

* cited by examiner

*Primary Examiner*—Gary Portka
(74) *Attorney, Agent, or Firm*—Robert E. Bushnell, Esq.

(57) ABSTRACT

A redundant array of inexpensive disks (RAID) system includes a plurality of defect-adaptive memory devices for sequentially storing information needed for data recovery in a predetermined region of a recording medium in the form of block, and storing data in a region other than the predetermined region. A plurality of caches are connected to the adaptive memory devices to store information blocks needed for data recovery, the information blocks being read from a predetermined memory device. A controller is connected to each adaptive memory device and cache to control the writing and reading of data and information needed for data recovery in each memory device, calculate information needed for recovery of data read from each memory device, and store the information needed for recovery of data calculated in a predetermined cache.

9 Claims, 5 Drawing Sheets